UNITED STATES PATENT OFFICE.

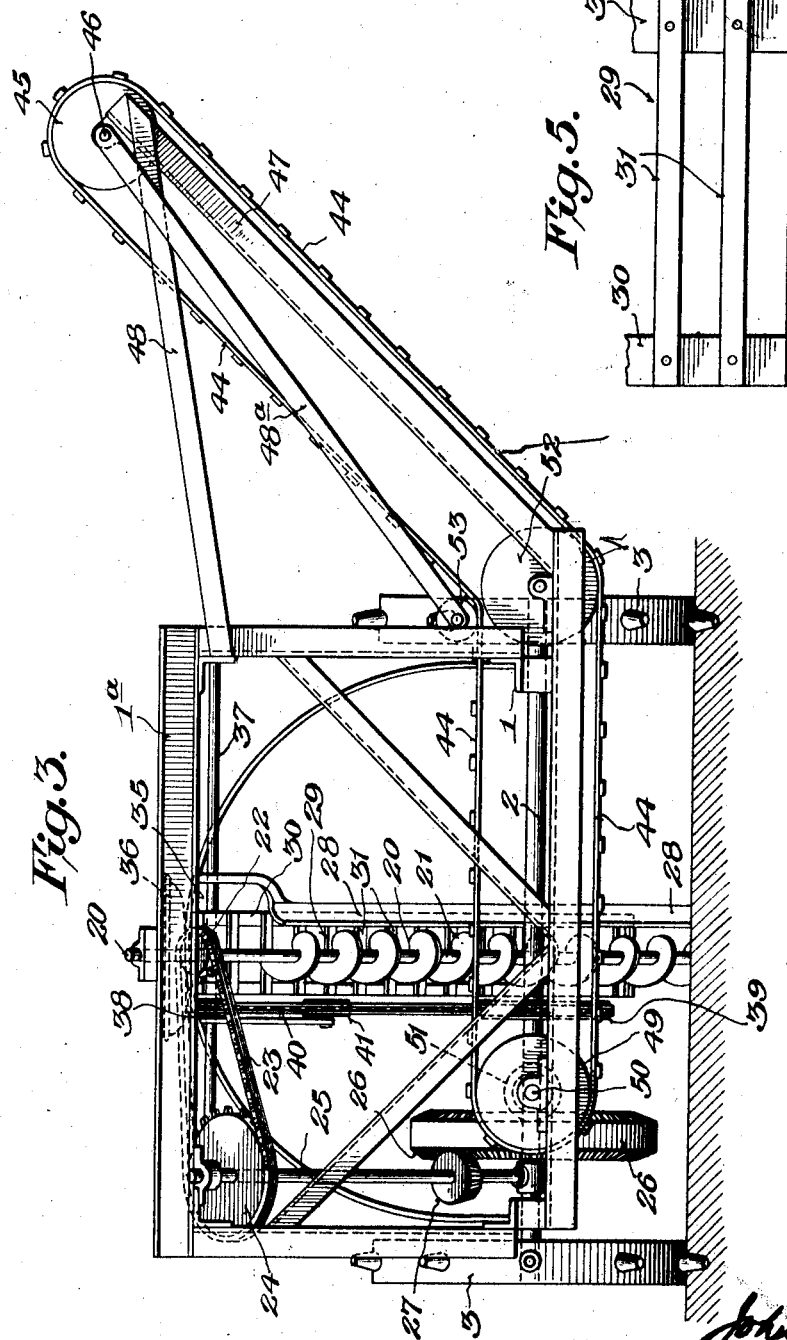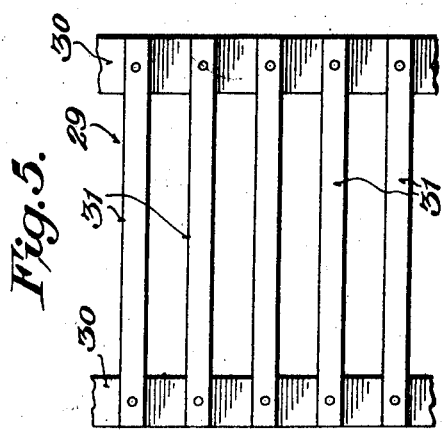

JOHN DEVEY, OF LEHI, UTAH, ASSIGNOR OF TWO-THIRDS TO UTAH IDAHO SUGAR CO., OF SALT LAKE CITY, UTAH, A CORPORATION OF UTAH.

BEET-HARVESTING MACHINE.

1,331,957.     Specification of Letters Patent.     Patented Feb. 24, 1920.

Application filed July 6, 1918. Serial No. 243,584.

*To all whom it may concern:*

Be it known that I, JOHN DEVEY, a citizen of the United States, residing at Lehi, in the county and State of Utah, have invented certain new and useful Improvements in Beet-Harvesting Machines; and I do hereby declare the following to be a full, clear, and exact description of the same, reference being had to the accompanying drawings, forming part of this specification.

This invention relates to beet harvesting machines, its principal object being to provide means for conveying the beets, from the ground, after they have been dislodged, to a place either on the side or at the rear of the machine where they may be readily collected.

The invention consists in the construction, arrangement and combination of parts hereinafter set forth, and the novel features of the invention will be particularly pointed out and specified in the claims at the end of the specification.

Referring to the accompanying drawings,—

Fig. 3 is a rear elevation; and

Fig. 5 is a detail view of the retaining belt.

Figure 1:
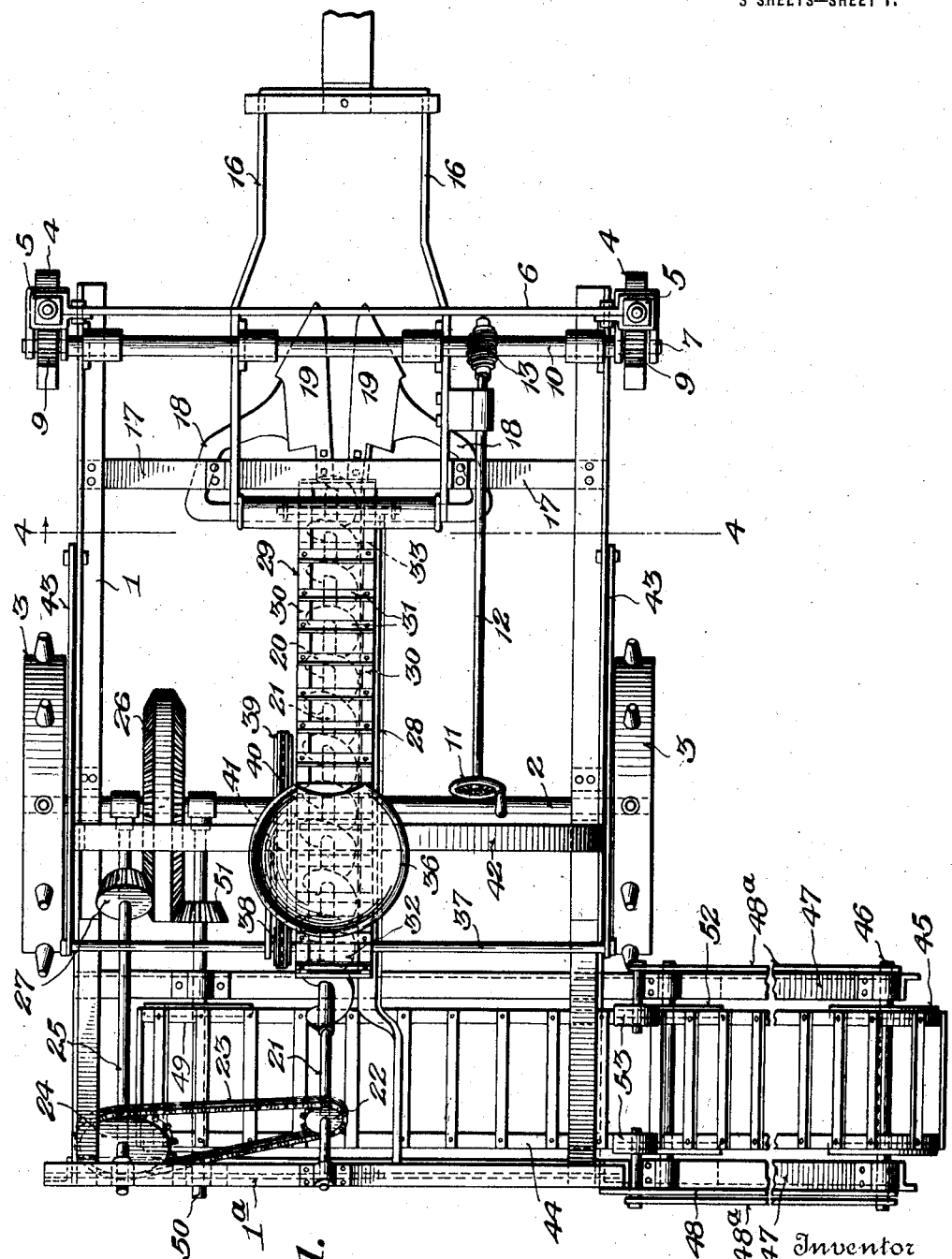
Figure 1 is a plan view of a machine embodying the present improvements.

The main frame of the machine which is indicated by the numeral 1 is supported on the axle 2, hereinafter referred to as the main drive shaft 2, which carries the usual ground wheels 3. The forward portion of the main frame 1 is supported by caster wheels 4 journaled in a supplemental frame composed of upright side members 5, 5 on the opposite sides of the main frame and transverse members 6, 6, connecting the side members 5, 5. To permit the supplemental frame to be adjusted vertically with respect to the main frame, each of its side members 5, 5 is slidably mounted in sleeves 7, in the main frame, and each is provided on one of its sides with a vertically extending series of teeth 8 which mesh with gear wheels 9 on the ends of a transversely extending shaft 10 rotatably mounted in the main frame. The supplemental frame is adjusted by rotating hand wheel 11 on shaft 12 which is journaled in the main frame and is provided at its end adjacent shaft 10 with a worm 13 meshing with a worm wheel 14 on the shaft.

Mounted in the forward portion of the main frame is a second supplemental frame 16, these two frames being tied together by a transverse brace 17. The forward end of the supplemental frame is adapted to have the ordinary tongue secured thereto and at its rear end there are secured the depending arms 18 on which are mounted the plow points 19. The plow points 19 are spaced apart transversely of the frame to exert a pulling action on the beets and are inclined rearwardly of the machine to slightly elevate the beets after they have been dislodged from the earth.

Means for conveying the beets, after they are dislodged, toward the rear of the machine, are provided at the rear of the plow points 19, a rearwardly extending inclined worm conveyer 20, carried by a shaft 21 secured to one of the plow points in any suitable manner, being illustrated as the preferred means for accomplishing this object. The rear end of the conveyer shaft 21 is journaled in the rear cross bar 1ᵃ of the main frame 1 and adjacent its rear end said shaft is provided with a sprocket wheel 22 adapted to be driven by a sprocket chain 23 passing over a relatively large sprocket wheel 24 on a counter shaft 25 which is mounted in the main frame and is driven by the main drive shaft 2 through coöperating bevel gears 26 and 27 mounted on said main and counter shafts, respectively.

To prevent the beets from falling out of the conveyer 20 there is provided a retaining bar 28 which extends along one side of the conveyer 20, the front end of the bar being secured to one of the plow points and its rear end to the cross member 1ᵃ of the main frame. As shown, this retaining bar 28 is located on the side of the conveyer to which the beets will be moved by the rotary movement of the latter, bar 28 and the conveyer substantially forming a trough.

Figure 2:
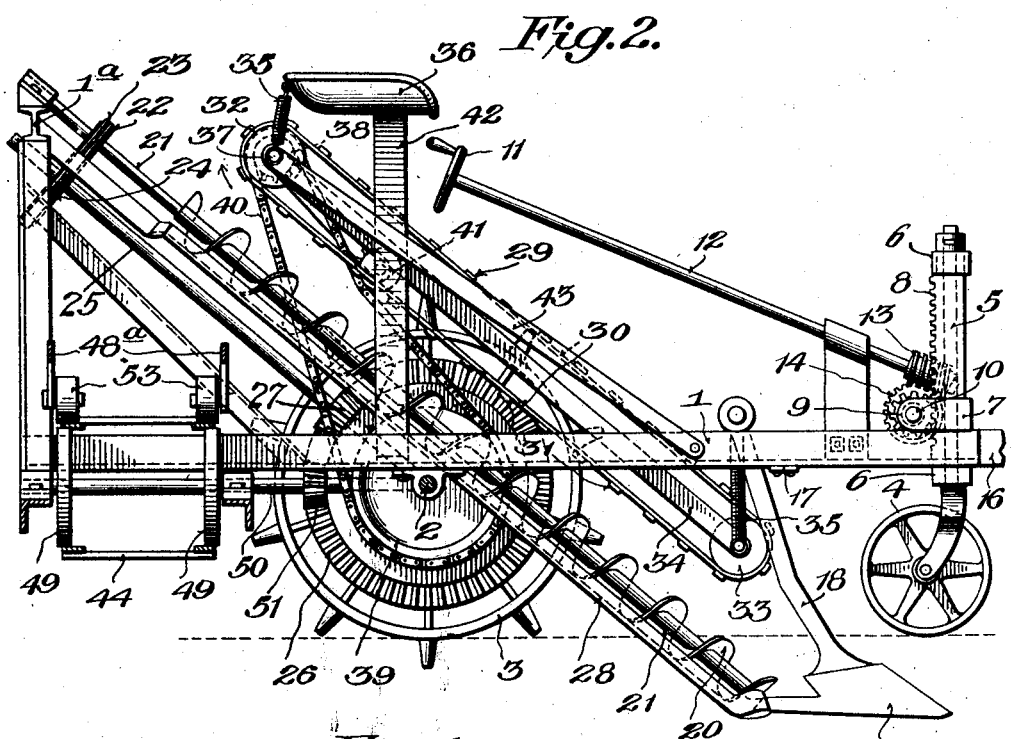
Fig. 2 is a side elevation of the machine.
Figure 4:
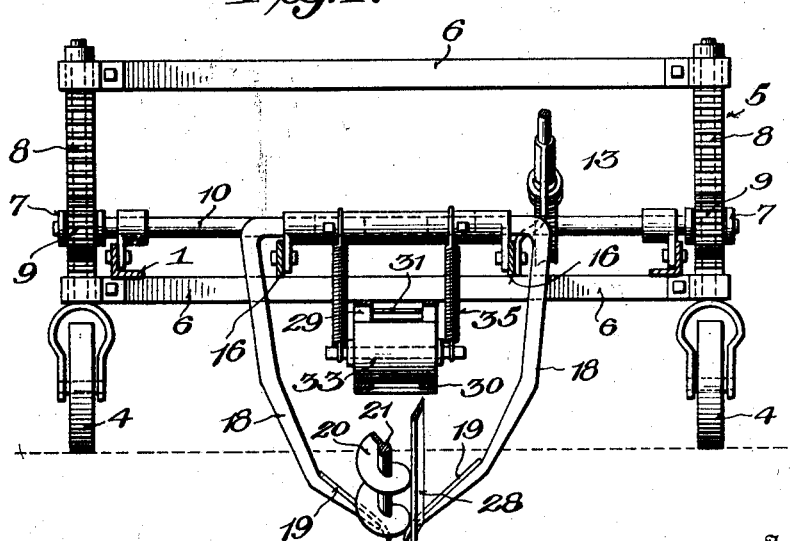
Fig. 4 is a vertical sectional view taken on the line 4—4 of Fig. 1, looking toward the front of the machine.

A second means is also provided for retaining the beets in the conveyer during their movement toward the rear of the machine. These additional means preferably consist of an endless belt 29 composed of two longitudinally extending belts 30 connected by a plurality of spaced, transversely extending, light spring steel straps 31 adapted, when the belt is in position, to engage the beets and press them lightly into or between the convolutions of the conveyer 20. Belt 29 travels over pulleys 32 and 33 in a belt frame 34 and is adapted to be actuated in a manner to be presently described. As shown in the drawings the belt frame is suspended from the main frame above the conveyer 20 in such manner as to yield upwardly to accommodate beets of varying sizes and to prevent bruising of beets of relatively large size, this being accomplished by suspending the beet frame on spiral springs 35, 35, which are attached preferably to the main frame 1 and the seat 36. Mounted on shaft 37 which carries the upper pulley 32 is a sprocket wheel 38 which is adapted to be driven in the direction indicated by the arrow in Fig. 2 by a sprocket wheel 39 mounted on the main drive shaft 2 through a sprocket chain 40, an idle pulley 41 being mounted on the seat support 42 in contact with the sprocket chain to maintain the chain under proper tension.

Shaft 37 in the upper end of the belt frame extends transversely of the machine to the opposite sides of the frame and at its ends is supported by brace rods 43, 43 pivoted on the side members of the main frame. These brace rods maintain the belt substantially parallel to the conveyer 20 and at the same time permit the entire frame to move toward and from the conveyer for the purposes heretofore mentioned.

Located below the rear end of the conveyer 20 is a transverse conveyer belt 44 constructed similarly to belt 29, which projects beyond one side of the main frame 1, the projecting portion preferably extending upwardly from the main frame to a height sufficient to permit a wagon to pass beneath its outer extremity. Pulley 45 over which the outer end of the belt 44 passes, is mounted on a shaft 46 journaled in a supplemental frame 47 which extends upwardly from the side of the main frame 1 and is supported by brace rods 48, 48ª secured to the side of the main frame. The inner end of belt 44 passes over a pulley 49 mounted on a countershaft 50 which is driven by the main drive shaft 2 through coöperating bevel gears 26, 51, mounted on the main and counter-shafts respectively. A loosely mounted pulley 52 is located between the reaches of the belt intermediate the pulleys 45 and 49 and an idle pulley 53 is positioned on the outer side of the belt adjacent the loose pulley to hold the conveyer under proper tension.

While I have shown a machine capable of digging only one row of beets at a time, if desired a machine embodying the present improvement and capable of digging two or more rows at a single operation may readily be constructed by duplicating the plow points, conveyer 20, and retaining belts 29, the conveyers and retaining belts being actuated from the main drive shaft 2 in the manner heretofore described and adapted to deliver the beets onto the transverse belt 44.

In the drawings, I have shown certain specific details for accomplishing probably the best results, and in the foregoing specification have described such details. It will be evident, however, that I need not be limited thereto otherwise than to the extent to which the following claims limit me.

What is claimed is:

1. In a beet harvesting machine, the combination with the main frame, of beet pulling members mounted on said frame, means for conveying the beets rearwardly from the pulling members, means for retaining the beets in the conveyer on one side of the latter, beet retaining means above the conveying means, supporting means for the last mentioned retaining means yieldingly suspended in close proximity to the conveying means, said supporting means being movable toward and away from the conveying means throughout their length, and means for conveying the beets transversely of the main frame located adjacent the rear end of the first mentioned conveying means.

2. In a beet harvesting machine, the combination with the main frame, of beet pulling members carried thereby, means for conveying the beets rearwardly from the pulling members, a retaining member located on one side of the conveying means, a frame yieldingly suspended above the conveying means and movable toward and away from said conveying means throughout its length, a second retaining means carried by said frame, and means located at the rear of the first mentioned conveying means for conveying the beets transversely of the main frame.

3. In a beet harvesting machine, the combination with the main frame, of beet pulling members carried thereby, conveying means for conveying the beets away from the pulling members, a frame yieldingly suspended above the conveyer means, said frame being movable toward and away from the conveying means throughout its length, and retaining means carried by the frame and positioned immediately above the conveyer means.

4. In a beet harvesting machine the combination with the main frame, of beet pulling members mounted on said frame, means for conveying the beets rearwardly from the pulling members, means for retaining the beets in the conveying means on one side of the latter, beet retaining means above the conveyer, resilient suspension members supporting the last mentioned retaining means in proximity to the conveying means, and transverse conveying means located adjacent the rear end of the first mentioned conveying means.

5. In a beet harvesting machine, the combination with the main frame, of beet pulling members mounted on said frame, a worm conveyer attached to one of the pulling members, beet retaining means mounted on the other pulling member and extending along one side of the conveyer, a frame, a second retaining means carried by said frame, and resilient suspension members supporting said frame immediately above the conveyer.

6. In a beet harvesting machine, the combination of a main frame, beet pulling members carried thereby, conveying means for conveying the beets away from the pulling members, a frame, beet retaining means carried thereby, and resilient suspension members supporting said frame with the retaining means immediately above the conveying means.

JOHN DEVEY.